United States Patent [19]

Jarret et al.

[11] 4,172,590

[45] Oct. 30, 1979

[54] SPRING INVOLVING THE HYDROSTATIC COMPRESSION OF AN ELASTOMER

[75] Inventors: Jean M. Jarret, Meounes les Montrieux; Jacques H. Jarret, Louveciennes, both of France

[73] Assignee: Societe d'Exploitation des Ressorts Auto-Amortisseurs Jarret, France

[21] Appl. No.: 787,086

[22] Filed: Apr. 13, 1977

[30] Foreign Application Priority Data

Apr. 23, 1976 [FR] France .................................. 76 12146

[51] Int. Cl.² .............................................. F16F 1/36
[52] U.S. Cl. ..................................... 267/149; 267/152; 427/409; 428/462
[58] Field of Search .................... 267/30, 37 R, 47, 81, 267/83, 103, 148, 149, 151, 152, 158; 427/409; 428/441, 462

[56] References Cited

U.S. PATENT DOCUMENTS

| 1,676,489 | 7/1928 | Geyer | 267/30 |
| 2,935,177 | 5/1960 | Morris | 267/149 |
| 3,357,850 | 12/1967 | Baker | 427/409 |
| 3,562,089 | 2/1971 | Warhaka et al. | 428/462 |

FOREIGN PATENT DOCUMENTS

| 814363 | 7/1951 | Fed. Rep. of Germany | 267/30 |
| 1032039 | 6/1958 | Fed. Rep. of Germany | 267/152 |
| 261829 | 5/1970 | U.S.S.R. | 267/149 |

Primary Examiner—Edward R. Kazenske
Attorney, Agent, or Firm—Marn & Jangarathis

[57] ABSTRACT

The invention is concerned with an absorbing spring involving the hydrostatic compression of an elastomer, comprising a tight casing constituted by a deformable, bent elastic tube of flattened section, filled with elastomer. A central core is embedded in the elastomer, the core being made of elastic material, the coefficient of heat expansion of which is lower than that of the tube. The invention finds particular application in the manufacture of absorbing devices.

7 Claims, 2 Drawing Figures

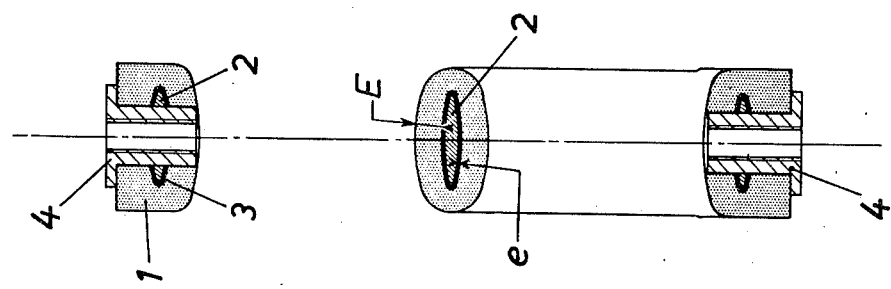
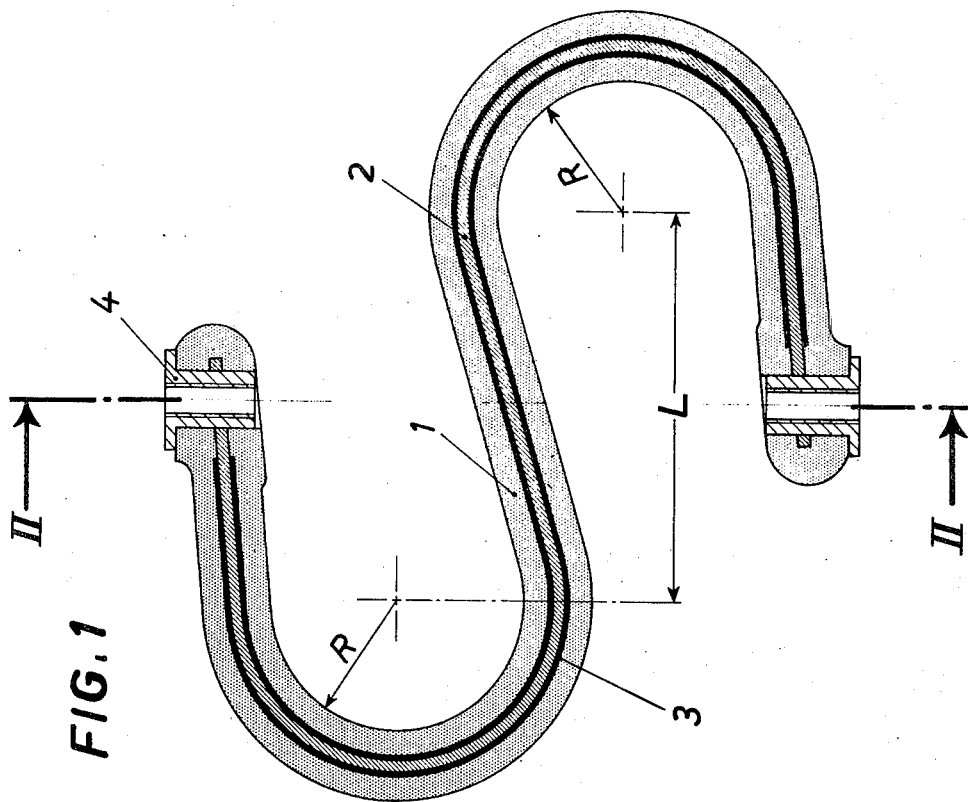
FIG. 1
FIG. 2

SPRING INVOLVING THE HYDROSTATIC COMPRESSION OF AN ELASTOMER

The present invention relates to an absorbing spring involving the hydrostatic compression of an elastomer.

It is known to produce a spring by enclosing a mass of elastomer, e.g. rubber, in a tight casing of internal volume which is variable under the action of external forces. When the casing is deformed, under the effect of the said forces, the spring accumulates energy by hydrostatic compression of the elastomer enclosed in the casing. The deformation of said casing may either be of the type with sliding of a mobile wall in a cylinder or of the elastic type. The accumulated energy is restored by allowing the elastomer to take back in initial volume, i.e. by pushing back the said mobile wall or by annuling the elastic deformation taken by the casing.

In the case of an elastically deformed casing, sliding joints are advantageously avoided. The casing is then preferably constituted by a tube of flattened or elliptic section curved as a C or an S, of the so-called Bourdon tube pressure gauge type.

It is also known to make absorbing springs from this latter type of spring. In fact, it suffices to shape the casing so that these elastic deformations impose movements on the elastomer by a non-homogeneous compression of said elastomer, which cause a transformation into heat of part of the energy received by the spring.

One of the drawbacks of this type of equipment lies in the fact that it is very sensitive to the variations in ambient temperature. In fact, the coefficient of heat expansion of the casing is generally much lower than that of the compressed elastomer. This difference brings about, for variations in ambient temperature of several tens of degrees C, relative deformations of the casing and of the elastomer which it contains, which are of the same magnitude as those due to the external mechanical efforts normally applied to these springs. The operational characteristics of these springs are therefore much disturbed by the variations in ambient temperature.

Another drawback of this known device lies in too weak an absorbing effect. This is due to the fact that the movements of the elastomer in the casing are not great in view of the minimum variations of the internal section of the tube, when it is elastically deformed.

It is an object of the present invention to remedy these drawbacks by proposing an improvement in these known springs, making it possible, by a simple means, on the one hand to conserve the substantially constant operational characteristics of the springs, whatever the ambient temperatures when it is used, whilst increasing its absorbing effect, and on the other hand to simplify manufacture thereof.

To this end, the invention relates to an absorbing spring of the type involving the hydrostatic compression of an elastomer, comprising a tight casing constituted by a bent, flat-sectioned, deformable elastic tube, filled with elastomer. According to the invention, this spring comprises a central core embedded in the elastomer, made of an elastic material whose coefficient of heat expansion is lower than that of the tube. Said core is such that the quotient of the internal section of the tube by its own section is equal to the quotient of the difference in the coefficients of expansion of the elastomer and said core by the difference in the coefficients of expansion of the elastomer and the tube.

In an advantageous embodiment of the invention, the thickness of elastomer disposed between the core and the tube is substantially constant. In addition, the sections of the tube and the core are elliptic.

It is also an object of the invention to provide a method of manufacturing a spring with central core, in which the outer tube-casing is made of laminated plastic material and the core is made of steel.

The invention will be more readily understood on reading the following description given with reference to the accompanying drawings, in which:

FIG. 1 is a view in section of a spring according to the invention in the form of an S;

FIG. 2 is a section along II—II of FIG. 1.

Referring now to the drawings, FIGS. 1 and 2 show a spring according to the invention, in the form of an S. This spring is constituted by a tube 1, the interior of which is filled with a core 2 and an elastomer 3. The internal section of the tube 1 as well as the section of the core 2 are substantially elliptic, as shown in FIG. 2. The space between the tube and the core filled with elastomer 3 is of substantially constant thickness.

The core is chosen to be of a material, such as steel, adapted to withstand without fatigue the deformations applied to the spring. It will be noted that the large axis of its section will preferably be about equal to ten times the small axis. It will also be noted that the thickness E of the tube 1 will advantageously be of the order of five to ten times greater than the thickness e of the elastomer 3. The material chosen for making the tube 1 must also withstand, without fatigue, the deformations undergone by the spring under load and experience has shown that a reinforced, laminated plastics material is highly suitable.

Finally, to be noted in these Figures is the presence of an insert 4 fixed by any suitable means to the ends of the spring, and particularly through the core 2.

The S-form of the spring as shown in the Figures is obviously not limiting and a spring of the same type may for example be constituted with one curve, thus giving it the general form of a C.

A preferred embodiment of this spring is as follows. There is applied over the whole surface of a rectilinear steel section, of elliptic cross-section such as that of core 2, a relatively thin layer of elastomer 3, in the form of a tube in the free state. This tube is force-fitted on said section so that it is applied energetically thereto. A plurality of layers of glass fibres or carbon fibres constituting the reinforcement of the plastic material of the tube are then disposed around the section thus sheathed. To this end, the various layers of fibres may advantageously be constituted of superposed woven supple tubes in which is introduced the elastomer-sheathed steel section. The assembly of the layers of fibres will be five to ten times thicker than the elastomer, as stated hereinabove.

The composite material thus constituted is bent, for example, as an S, as shown in the accompanying Figures, and then impregnated in vacuo with a heat-settable resin, which hardens for example by baking in an oven. It is then sufficient to equip the spring thus formed with inserts 4 enabling this spring to be fixed to the mechanical elements which it may connect elastically.

An example with figures is given hereinafter, corresponding to a spring which has actually been produced, adapted to support a load of 300 kg causing the two inserts 4 to move towards each other by about 10 cm.

The developed length of such a spring is 50 cm. The steel core 2 is of elliptic section, the small axis of which measures 4 mm and the large axis 4 cm. This core is coated with a layer of elastomer, particularly neoprene, 1 mm thick, which in the free state is in the form of a tube of inner diameter 25 mm. The thickness of the tube 1 is 7 mm. The radius R of curvature of the spring in the free state is 3 cm. The distance L separating the two centres of curvature is 10 cm.

The coefficient of heat expansion of the laminated material constituting the tube 1 is $50 \cdot 10^{-6}$ per degree C., that of the elastomer 3 is $120 \cdot 10^{-6}$ and that of the core 2 is $11 \cdot 10^{-6}$. The surface of the section of the core is equal to 126 mm$^2$, that of the section of the tube is equal to 198 mm$^2$, their ratio is therefore 0.64. The quotient of the difference in the coefficients of expansion of the elastomer and the tube, i.e. $(120-50) \cdot 10^{-6}$ by the difference in the coefficients of expansion of the elastomer and of the core, i.e. $(120-11) \cdot 10^{-6}$ is equal to 0.64. An equality is therefore established between the ratio of the sections and the quotient of the differences in coefficients of expansion. It is verified that this equality enables, for an increase in temperature of 1° C., the increase in section of the elastomer ($86 \cdot 10^{-4}$ mm$^2$) to be equal to the difference between the increase in internal section of the tube ($99 \cdot 10^{-4}$ mm$^2$) and the increase in section of the core ($13 \cdot 10^{-4}$ mm$^2$).

It is seen that with the arrangement according to the invention, any relative variation in volume between the tube and the elastomer is compensated. In this way, the ambient temperature will be virtually without action on the characteristics of the spring.

It will further be noted that, when the spring supports its maximum load of 300 kg, the small axis of the elliptic section of the tube 1 is reduced in the bent part by about 1 mm, thus passing internally from 6 mm to 5 mm. The section of the core 2 made of steel being practically undeformable, the thickness of the elastomer is therefore reduced by half in this zone and the excess elastomer is forced to the less compressed zones, particularly the rectilinear parts of the tube or the ends of the large axis of the elliptic section. This results in a great deal of viscous friction which causes a considerable absorbing effect. Thus, if the spring of the above example is subjected to the action of a load of 150 kg animated by a sinusoidal movement of an amplitude of 6 cm, it will suffice five free oscillations of this spring to reduce the amplitude to 1 mm, this corresponding to a logarithmic decrement of about 0.7. It is certain that more or less considerable absorptions may be obtained by modifying the thickness of the layer of elastomer and the characteristics of this elastomer.

The advantages of the invention lie essentially in the stability of the characteristics of the spring, whatever the conditions of ambient temperature, the absorbing effect of such a spring and finally the simplicity of its manufacture, which may be massproduced at a very low cost price.

The invention finds advantageous application in the manufacture of suspensions, particularly anti-vibratory suspensions of machines, riddles, vehicles, particularly railway stock, etc.

What is claimed is:

1. An absorbing spring which comprises:
   a metallic core embedded within an elastomer; and
   a deformable elastic tube of flattened section tightly and totally encasing said elastomer, said elastomer being subject to hydrostatic compression forces and having a coefficient of heat expansion lower than the coefficient of heat expansion of said elastic tube thereby conserving the substantially constant operational characteristics of the spring.

2. The absorbing spring as recited in claim 1, wherein the quotient of the interior cross-sectional area of the tube to the cross-sectional area of said core is equal to the quotient between the difference in the coefficients of expansion of said elastomer and said core to the difference in the coefficients of expansion of said elastomer and said tube.

3. The spring as recited in claim 2, wherein the thickness of said elastomer between said core and said tube is substantially constant.

4. The spring as recited in claim 1, wherein said tube and said core are elliptically-shaped.

5. The spring as recited in claim 1, wherein said tube is formed of laminated plastic materials and said core is steel.

6. The absorbing spring as defined in claim 1 wherein the large axis of said core is about 10 times the small axis thereof.

7. The absorbing spring as defined in claim 1 wherein the thickness of said tube is 5 to 10 times the thickness of said elastomer.

* * * * *

UNITED STATES PATENT OFFICE
CERTIFICATE OF CORRECTION

Patent No. 4,172,590   Dated October 30, 1979

Inventor(s) Jean M. Jarret; Jacques H. Jarret

It is certified that error appears in the above-identified patent and that said Letters Patent are hereby corrected as shown below:

Column 1, Line 16, "in" should be --its--;

Column 1, Line 62, "made" should be --and formed--;

Column 1, Line 62, "whose" should be --wherein the core has a--

Column 1, Line 63, "is" should be deleted from sentence;

Column 4, Line 22, after the word "and" insert --said core--;

Column 4, Line 24, "thereby" should be --whereby--.

Signed and Sealed this

Ninth Day of December 1980

[SEAL]

Attest:

SIDNEY A. DIAMOND

Attesting Officer   Commissioner of Patents and Trademarks